(12) United States Patent
Erber

(10) Patent No.: US 10,751,647 B1
(45) Date of Patent: Aug. 25, 2020

(54) SLUDGE COLLECTION SYSTEM FOR A CLARIFIER

(71) Applicant: Kusters Zima Corporation, Spartanburg, SC (US)

(72) Inventor: Paul J. Erber, Fletcher, NC (US)

(73) Assignee: Kusters Zima Corporation, Spartanburg, SC (US)

( * ) Notice: Subject to any disclaimer, the term of this patent is extended or adjusted under 35 U.S.C. 154(b) by 0 days.

(21) Appl. No.: 16/454,140

(22) Filed: Jun. 27, 2019

(51) Int. Cl.
| | |
|---|---|
| *B01D 21/24* | (2006.01) |
| *B01D 21/30* | (2006.01) |
| *F16K 1/20* | (2006.01) |
| *F16K 3/02* | (2006.01) |
| *C02F 1/00* | (2006.01) |

(52) U.S. Cl.
CPC .......... *B01D 21/30* (2013.01); *B01D 21/245* (2013.01); *B01D 21/2461* (2013.01); *F16K 1/2007* (2013.01); *F16K 3/0218* (2013.01); *C02F 2001/007* (2013.01)

(58) Field of Classification Search
CPC .. B01D 21/245; B01D 21/2461; B01D 21/30; F16K 1/2007; F16K 3/0218
USPC .......... 210/523, 528, 803; 251/93, 147, 235, 251/299, 300
See application file for complete search history.

(56) References Cited

U.S. PATENT DOCUMENTS

| | | | | |
|---|---|---|---|---|
| 2,236,128 A | * | 3/1941 | Poole .................. | B01D 21/245 210/531 |
| 2,922,524 A | * | 1/1960 | Rankin ................ | B01D 21/245 210/528 |
| 3,371,788 A | * | 3/1968 | Smith .................. | B01D 21/245 210/528 |
| 3,521,665 A | * | 7/1970 | Poulsen ............... | F16K 3/0218 251/300 |
| 3,797,664 A | | 3/1974 | Pentz et al. | |
| 3,800,955 A | * | 4/1974 | Edgerton ............. | B01D 21/245 210/528 |
| 4,069,150 A | * | 1/1978 | Lodholz ............... | B01D 21/245 210/528 |
| 4,094,785 A | | 6/1978 | Booty | |
| 4,193,877 A | | 3/1980 | Lillywhite | |
| 4,832,078 A | * | 5/1989 | Szekely ................ | F16K 1/2007 251/298 |
| 5,219,470 A | | 6/1993 | Bradley et al. | |
| 5,490,920 A | | 2/1996 | Fruchtbaum et al. | |

(Continued)

*Primary Examiner* — Christopher Upton
(74) *Attorney, Agent, or Firm* — Timothy J. Monahan; Monahan & Company, LLC

(57) ABSTRACT

A clarifier having a suction-type sludge recovery system is provided with at least one trough extending across the top of the tank and partially submerged in the liquid and a plurality of suction pipes extending from the bottom of the tank to openings in the bottom of the trough. A flow control assembly associated with each of the suction pipes includes a bracket attached to the top of the trough, a damper plate slidable relative to the openings in the trough and a control arm, which is connected to the damper plate and supported by the bracket, for adjusting the orientation of the damper plate, and therefore the flow rate of sludge into the trough. The flow control assembly is offset from the central axis of the suction pipe, so that when the damper plate is open, the suction pipes can be rodded out to disperse clogs.

10 Claims, 5 Drawing Sheets

(56) References Cited

U.S. PATENT DOCUMENTS

| | | | | |
|---|---|---|---|---|
| 5,830,356 A | * | 11/1998 | Kauppila | B01D 21/2461 |
| | | | | 210/528 |
| 5,944,300 A | * | 8/1999 | Gillard | F16K 3/10 |
| | | | | 251/300 |
| 6,045,709 A | | 4/2000 | Roberts | |
| 6,371,308 B1 | | 4/2002 | Zhou | |
| 8,128,058 B2 | | 3/2012 | Quinn et al. | |
| 8,251,088 B2 | | 8/2012 | Wark | |
| 2015/0251110 A1 | * | 9/2015 | Carrand | B01D 21/245 |
| | | | | 210/523 |
| 2017/0333813 A1 | * | 11/2017 | Haggard | B01D 21/245 |

* cited by examiner

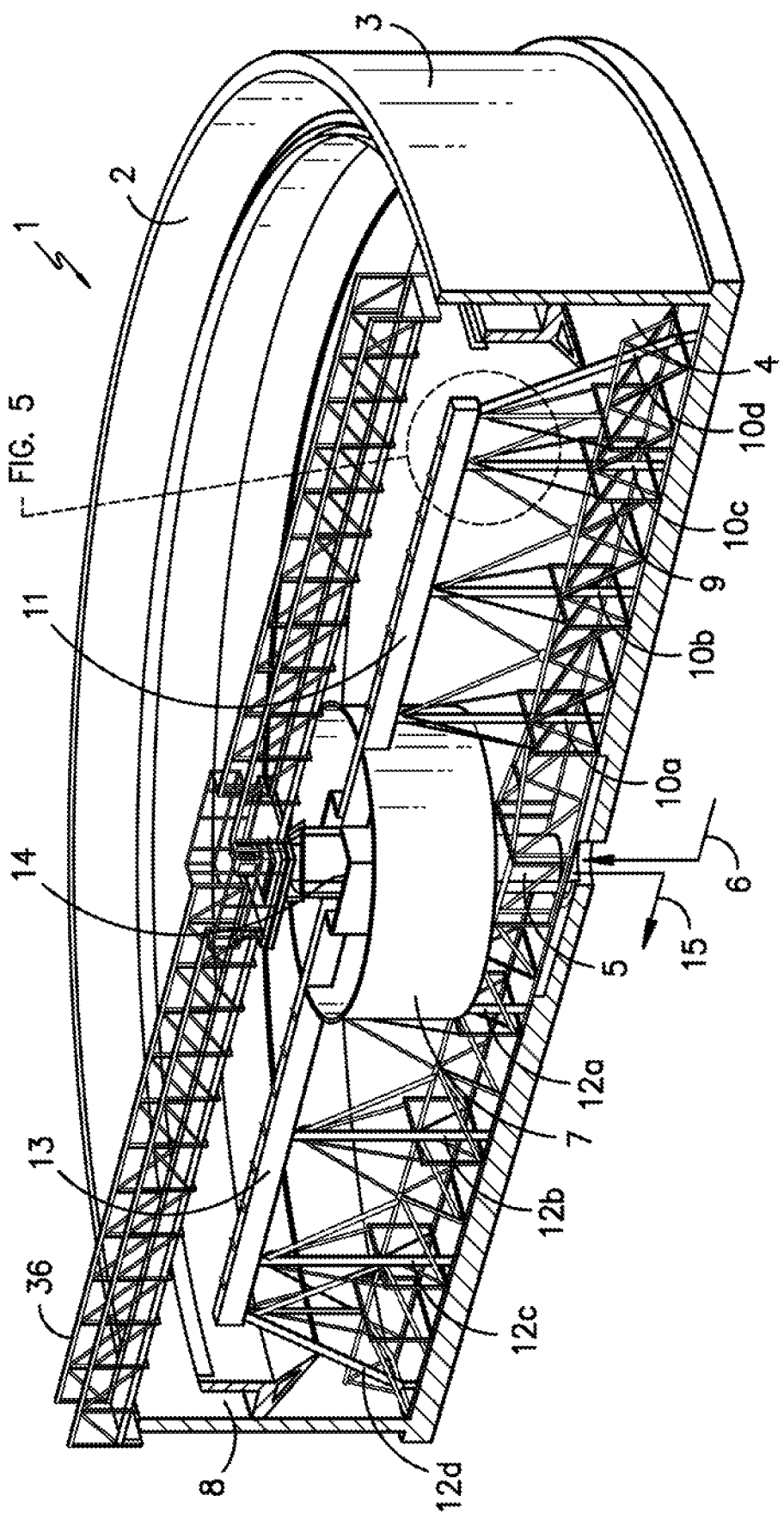

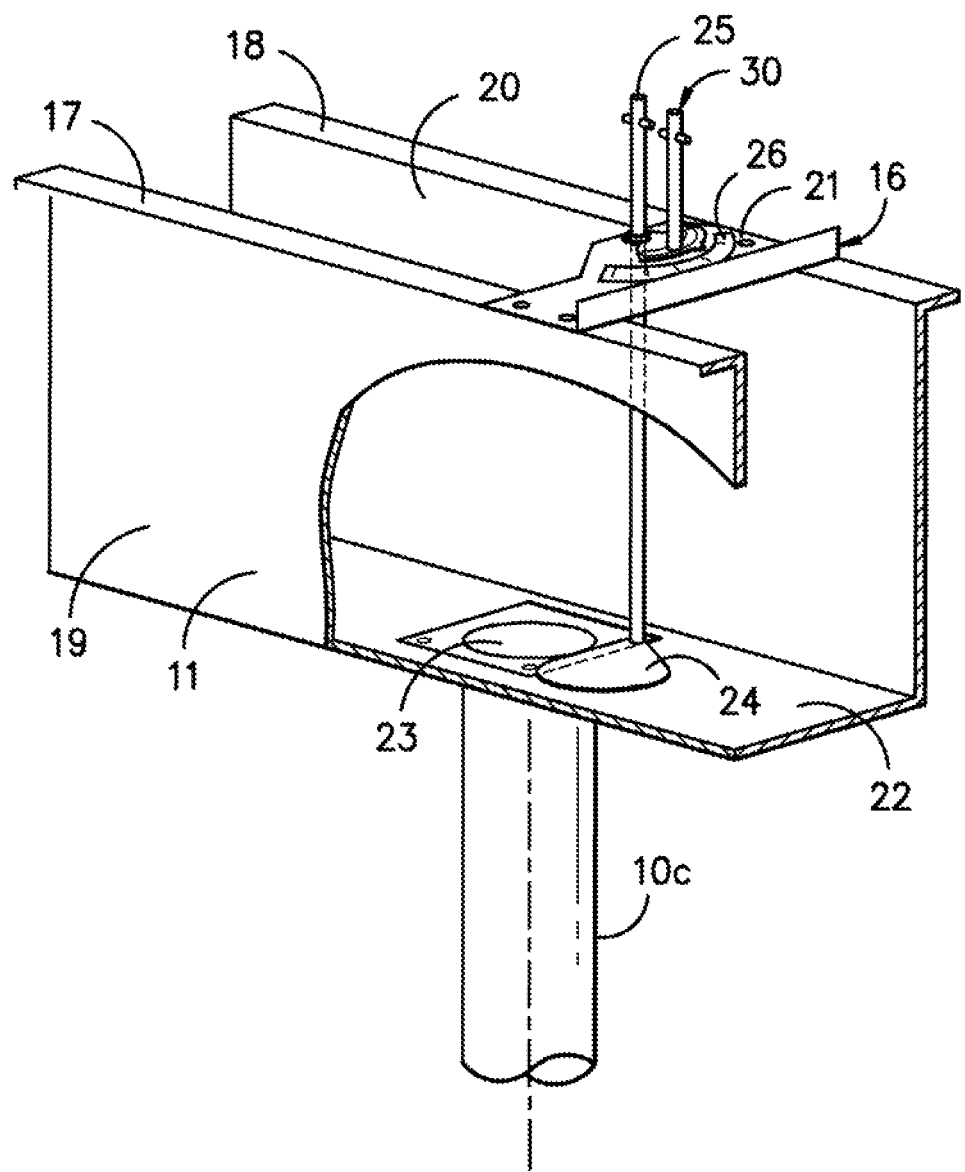
FIG. -2-

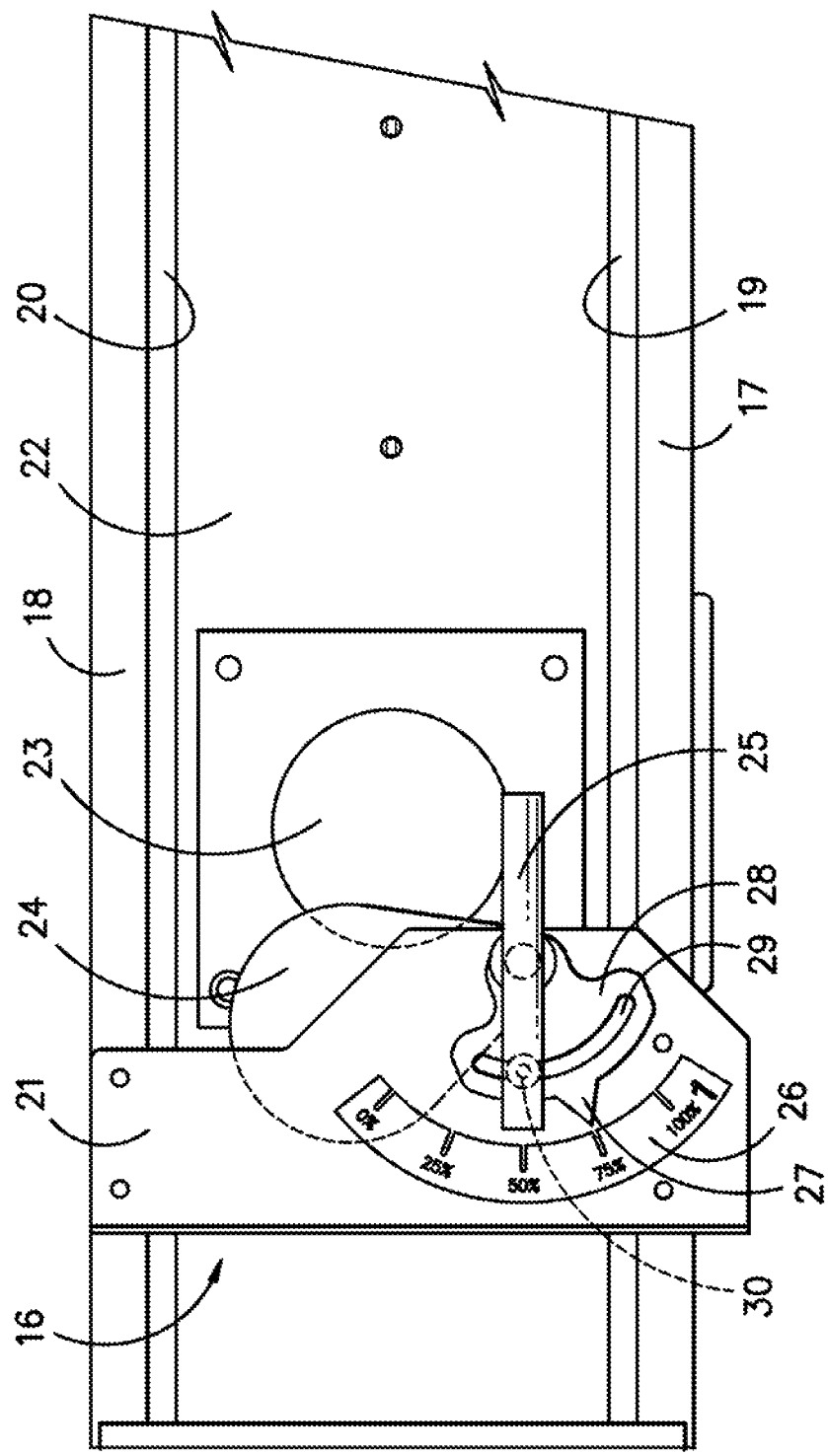
FIG. -3-

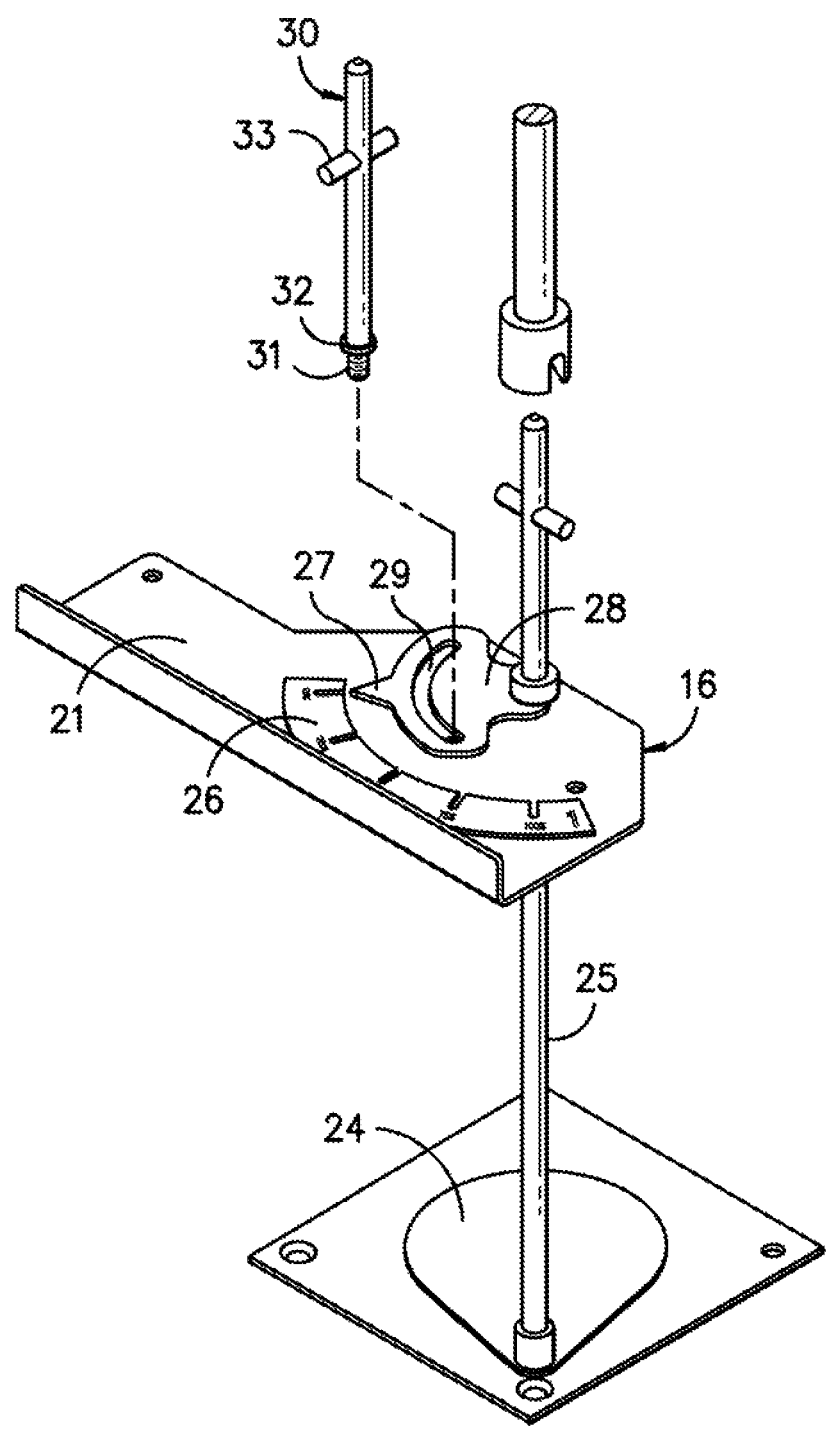
FIG. -4-

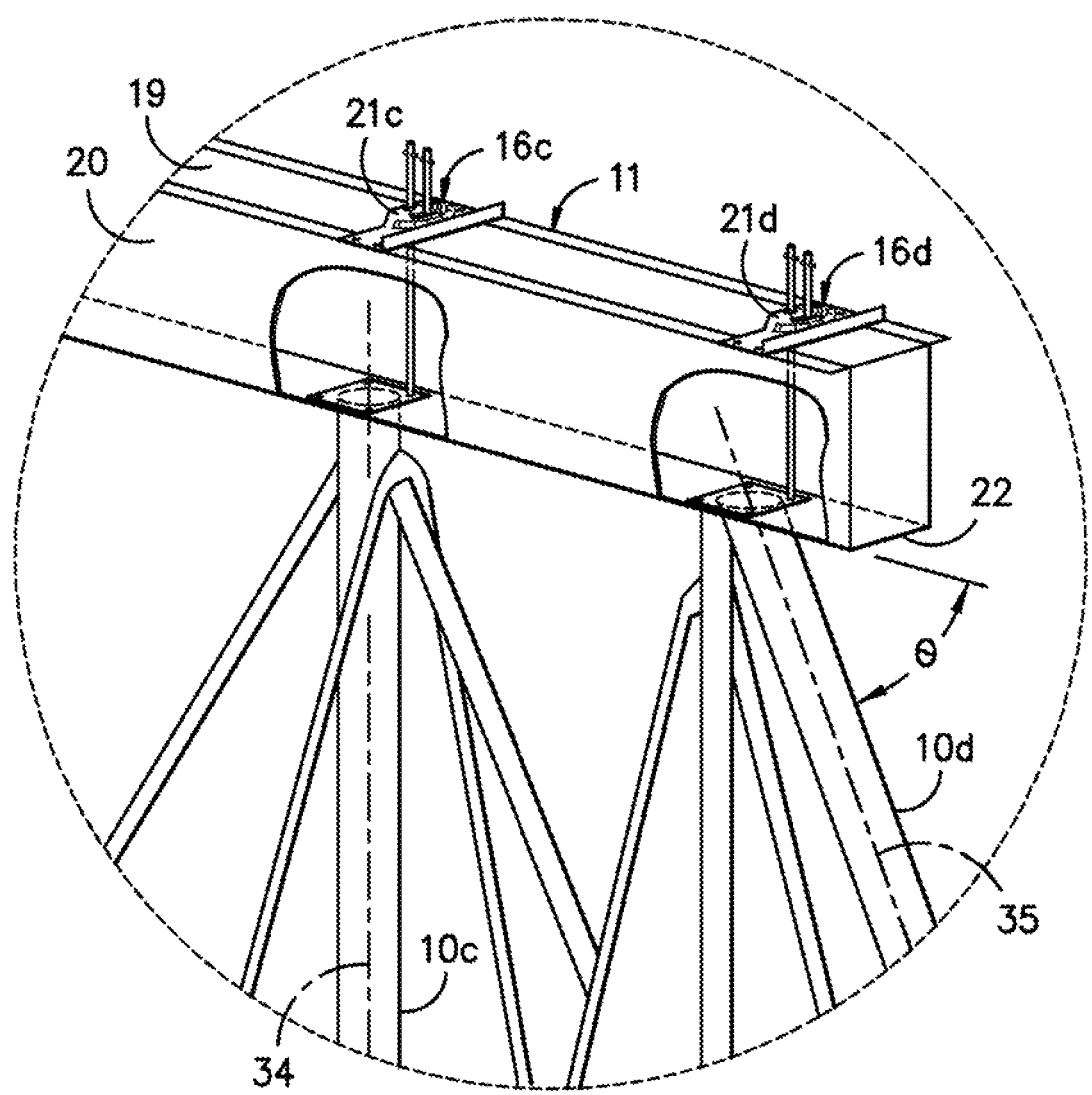
FIG. -5-

SLUDGE COLLECTION SYSTEM FOR A CLARIFIER

This invention is directed to an assembly for removing sludge from a clarifier, whereby the rate of removal can be readily controlled and the assembly can be easily serviced. The invention is particularly useful in the field of wastewater treatment.

BACKGROUND OF THE INVENTION

Wastewater treatment systems typically incorporate a clarifier. For example, the clarifier may be a settling tank, wherein suspended solids in the influent stream are allowed to settle and are continuously removed from the bottom of the tank in the form of a sludge. The sludge contains bacteria and other microorganisms capable of digesting the organic matter found in sewage. A portion of the sludge can be introduced upstream in the wastewater treatment system and is referred to as "return activated sludge" or RAS.

Various devices have been developed to remove the sludge from the bottom of the clarifier where it has settled. For example, the sludge may be removed by suction generated by a head differential, siphon, pump or combinations thereof.

Zhou—U.S. Pat. No. 6,371,308 B1, discloses a system of stationary collection tubes arranged at the bottom of the clarifier. A rake sweeps the bottom of the clarifier to move the sludge to orifices distributed along the collection tubes.

Pentz et al.—U.S. Pat. No. 3,797,664 and Fruchtbaum et al.—U.S. Pat. No. 5,490,920 disclose one or two vertical suction pipes that are supported on a trolley above the surface of the liquid in the clarifier. The trolley traverses from the center of the clarifier to the perimeter of the clarifier, to vacuum sludge off of the bottom.

Bradley et al.—U.S. Pat. No. 5,219,470 disclose a "collection box" mounted on the central column of the clarifier. A suction pipe extends from the bottom of the clarifier to the collection box. The collection box and the suction pipe revolve together around the central column, to sweep the bottom of the clarifier. The collection box is submerged in the liquid within the clarifier and sealed, to create suction. A valve controls the flow of sludge to the collection box. The valve handle (37) is accessible from the bridge or walkway above the clarifier.

Rather than the suctions pipes feeding directly into a central collection box, the suction pipes may be connected to and feed into a trough, for example, through openings in the bottom of the trough, and the trough feeds into a central receptacle. The trough may revolve around a central pier, allowing the suction pipes to sweep along the bottom of the tank. The flow rate of sludge into the trough may be adjusted by partially covering the openings in the trough with a plate. In operation, adjusting the flow rate of sludge into the trough typically involves lowering the liquid level in the clarifier to expose the bolts securing the plates, loosening the bolts, repositioning the plates and re-tightening the bolts.

The pipes or other conduits employed to draw the sludge from the bottom of the clarifier are susceptible to clogging. Booty U.S. Pat. No. 4,094,785 discloses a suction clarifier employing a siphon-type method. During operation, if the suction pipe becomes clogged, differential pressure builds, causing increased suction, which is usually strong enough to clear the clog. Nevertheless, in extreme cases, the clog must be attended to by an operator.

Despite the proliferation of sludge removal devices and methods, a need exists for a system that can readily control and adjust the rate of removal of sludge from the clarifier and can be conveniently serviced, for example, to unclog the suction pipes.

SUMMARY OF THE INVENTION

A clarifier is provided having a tank with sides and a bottom. A volume of liquid necessary for the optimum operation of the clarifier is maintained in the tank. During operation, an influent stream of liquid to be clarified may be continuously fed into the tank, while clear liquid is continuously removed from the upper layer of the tank and the settled solids in the form of a sludge are removed from the bottom layer of the tank. By way of example, the clarifier tank may be circular and have a diameter of from 20 feet to 300 feet and a depth of from approximately 10 feet to 16 feet.

The sludge collection system of the clarifier includes one or more suction pipes, a trough for receiving the sludge drawn upward by the suction pipes, and a flow control assembly, to regulate the flow of sludge from the suction pipes into the trough.

The trough functions as a collection manifold for receiving the sludge from the suction pipes and conveying it to a central collection point from which it is pumped to other areas of the wastewater treatment plant, such as a dewatering process, or the sludge is recycled as return activated sludge (RAS). The trough has a bottom and first and second sides extending upward from the bottom. The upper edges of the sides may be provided with flanges and components of the flow control assembly may be mounted on the flanges.

The bottom of the trough has one or more openings, with the number of openings corresponding to the number of suction pipes connected to the trough. The trough is aligned horizontally across the surface of the clarifier tank, so that it is partially submerged, that is, the bottom of the trough is below the level of the liquid in the tank and the upper edges of the trough are above the level of liquid in the tank. The trough may be supported by a central pier and extend radially outward from the center of the tank, and the sludge may flow inward and collect in a centrally positioned receptacle from which it is pumped. A second trough, incorporating the features identified herein with regard to a first trough, may be incorporated in the clarifier and, for example, aligned 180° from the first trough. In one embodiment of the invention, both the first and second trough are supported by a central pier.

The sludge is drawn from the bottom of the clarifier tank by one or more suction pipes. Each pipe has a lower end with an opening adjacent the bottom of the tank, that is, in the strata of sludge consisting of settled solids. The upper end of each suction pipe is connected to an opening in the bottom of a trough, thereby creating a watertight seal between the lower end of the suction pipe and an interior of the trough. As the sludge collects in the trough and is removed, the head differential creates the suction that draws additional sludge into the trough.

The number and diameter of the suction pipes is dependent upon the size of the clarifier tank—smaller installations may have three suction pipes, whereas larger installations may have ten or more. By way of example, a single trough may have from one to eight suction pipes connected to corresponding openings in the bottom of the trough.

In order to sweep the entire bottom of the clarifier tank, the trough typically revolves around a central axis, for example, driven by a suitable motor and gear system. Additionally, a rake may be incorporated in the system, which slowly travels along the bottom of the tank, as is known in the art, to prevent the sludge from compacting.

The rate at which the sludge is drawn from the bottom of the tank by any particular suction pipe can be independently regulated in the present invention by a flow control assembly. A damper plate is positioned over the opening in the bottom of the trough and is moveable relative to the bottom of the trough, to restrict the flow of sludge from the upper end of the suction pipe, through the opening and into the trough. By way of example, the damper plate may slide or pivot in a horizontal plane, that is, parallel to the bottom of the trough. Alternatively, the damper plate may be adjusted by tilting the damper plate from a horizontal, closed position, to a vertical, fully open position. The position of the damper plate is controlled by an arm having a lower end engaging the damper plate and an upper end extending upward from the bottom of the trough, so that the upper end of the arm terminates above the level of the liquid in the trough, preferably above the upper edges of the sides of the trough.

The control arm component of the flow control assembly is supported by a bracket, which is affixed to the trough. The bracket may be attached to a side of the trough, and if the upper edge of the side of the trough is provided with a flange, the bracket may be attached to the flange. In one embodiment of the invention, the bracket spans across the trough and is attached to both flanges on the first and second sides. In addition to supporting the control arm, the bracket may incorporate a position indicator, which is visible to an operator from above the trough. The position indicator functions in cooperation with the control arm—as the arm moves relative to the bracket, the orientation of the damper plate is shown by the position indicator.

The position indicator may include a calibrated section marked on the bracket component of the flow control assembly. The position of the control arm, and therefore the position of the damper plate, can be determined by observing the position of the control arm relative to the calibrated section of the bracket.

In one embodiment of the invention, the control arm operates by rotating in place, that is, when the control arm is turned, the damper plate moves relative to the opening in the bottom of the trough, for example, by pivoting in a horizontal plane. The upper end of the control arm may be provided with a t-handle for ease of operation. A lock plate may be attached to the control arm. One function of the lock plate is to secure the control arm in the desired orientation. The lock plate may pivot relative to the bracket, for example, in a horizontal plane, and include an arcuate channel. A fastener is positioned in the arcuate channel, whereby tightening the fastener secures the lock plate against the bracket, thereby locking the control arm in a desired orientation.

The fastener may be threaded to engage corresponding threads provided in the bracket. For example, the fastener may be a bolt with male threads at one end, which engage female threads in the bracket, and a head that clamps the lock plate and bracket together when the bolt is tightened. The upper end of the bolt may be provided with a t-handle for ease of operation. The lock plate may be provided with an index, such as a pointer, that correlates to the calibrated section of the bracket and the position of the damper plate.

An important consideration with regard to operation of any clarifier, particularly the sludge collection system, is maintenance. Regardless of their configuration, the suction pipes and flow control assemblies of the sludge collection system are prone to clogging. An advantage of the present system is the ease by which the sludge collection system may be serviced. For example, the bracket component of the flow control assembly that supports the control arm may be offset relative to the opening in the bottom of the trough, and the orientation of the suction pipe relative to the trough. If a suction pipe becomes clogged, an operator standing on a bridge mounted on top of the clarifier tank can force a rod through the clog, that is, "rod out" the suction pipe to disperse the clog and return flow to normal. Because the bracket is offset, a relatively rigid rod can be used to rod out the suction pipe, instead of having to work a flexible "snake" through the suction pipe. Maintenance may also be simplified by employing suction pipes that are relatively straight from the point of connection at the opening in the bottom of the trough to a distance of at least ½ the length of the pipe, at least ¾ the length of the pipe, or even the entire length of the pipe. Clogs can be cleared without having to lower the liquid level in the clarifier tank and without having to curtail operation of the clarifier.

Additional advantages of the present invention include the capability of separately adjusting the sludge flow from each of a plurality of suction pipes. Furthermore, such adjustments can be made from an operator standing on the clarifier bridge. Yet another advantage is the capability to adjust the flow control assembly for each suction pipe while the clarifier is fully operational. These and other advantages will become apparent from the drawings and detailed description of the invention contained herein.

BRIEF DESCRIPTION OF THE DRAWINGS

FIG. 1 is a perspective view of a clarifier, with a section of the tank removed to show the sludge collection system.

FIG. 2 is a perspective view of the trough, suction pipe and flow control assembly.

FIG. 3 is a top view of the trough and flow control assembly.

FIG. 4 is a perspective view of the flow control assembly, with an exploded view of the bolt used to lock the control arm in position.

FIG. 5 is a magnified view of the trough, suctions pipes and flow control assembly shown in FIG. 1.

DETAILED DESCRIPTION OF THE INVENTION

Without intending to limit the scope of the invention, the preferred embodiments and features are hereinafter set forth. All of United States patents and published patent applications cited in the specification are incorporated herein by reference.

Referring to FIG. 1, clarifier 1 has tank 2, with outer wall 3 and bottom 4. Clarifier 1 is circular, but a section of wall 3 and bottom 4 has been removed from FIG. 1, to show the components of the sludge removal system. Central pier 5 houses an influent pipe 6 for conveying a liquid containing suspended solids into clarifier 1. The influent stream flows into center feed well 7, an annular divider, which allows the liquid to become quiescent before it mixes with the liquid circulating in the tank. The clarified liquid spills over into launder 8, and becomes the effluent stream. The sludge collects on the bottom 4 of tank 2. The sludge consists of settled solids, which can include particulate matter, microorganisms, flocculants and precipitants.

The sludge collection and removal system incorporates rake 9, suction pipes 10*a*, 10*b*, 10*c*, 10*d*, which feed into trough 11, and suction pipes 12*a*, 12*b*, 12*c* and 12*d*, which feed into trough 13. Sludge drawn into troughs 11 and 13 feeds centrally into sludge collection box 14, and the sludge is conveyed downward through central pier 5 via return activated sludge pipe 15. As is known in the art, center feed well 7, rake 9, suction pipes 10a-10d and 12a-12d, troughs 11 and 13, and sludge collection box 14 slowly revolve 360° together around central pier 5, to sweep bottom 4 of tank 2. Stationary bridge 36 spans tank 2 and provides access to the flow control assemblies mounted on troughs 11 and 13 and associated with the suction pipes.

Referring to FIGS. 2, 3 and 4, flow control assembly 16 is attached to flanges 17 and 18 positioned along the upper edges of sides 19 and 20, respectively, of trough 11, by bracket 21. Suction pipe 10c is attached to the bottom 22 of trough 11 at opening 23. In addition to bracket 21, flow control assembly 16 further includes damper plate 24, which pivots in a horizontal plane, parallel to bottom 22 of trough 11. The orientation of damper plate 24 relative to opening 23 is determined by the position of control arm 25. Rotating control arm 25 in a clockwise direction causes damper plate 24 to restrict the flow of sludge into trough 11, whereas rotating control arm 25 in a counterclockwise direction causes damper plate to increase the flow of sludge.

Bracket 21 is provided with calibrations 26, which function as a position indicator for damper plate 24. For example, calibrations 26 may correspond to damper plate 24 being open 0%, 25%, 50%, 75% and 100%. Index 27 is connected to control arm 25, whereby rotating control arm 25 moves index 27 to the location on calibrations 26, corresponding to the position of damper plate 24. Index 27 may be incorporated into lock plate 28. Lock plate 28 has arcuate channel 29. Bolt 30 has threaded end 31, which engages corresponding female threads in bracket 21, head 32, which clamps lock plate 28 against bracket 21 to restrict the motion of control arm 25, and handle 33 for easy of bolt 30, when damper plate 24 is adjusted.

Alternatively, a male thread may be affixed to the bracket and extend upward through the arcuate channel in the lock plate, and the bolt used to clamp the lock plate against the bracket may have an internally-threaded female connector at the bottom. The diameter of the bolt may be greater than the width of the arcuate channel, thereby creating the clamping action.

While the details of the flow control assembly are illustrated with respect to suction pipe 10c and trough 11, it can be understood that each of suction pipes 10a, 10b, 10c, 10d, which feed into trough 11, and suction pipes 12a, 12b, 12c and 12d, which feed into trough 13, are associated with a comparable flow control assembly 16.

FIG. 5 shows a magnified view of the end of trough 11 from FIG. 1. Suction pipe 10c is substantially vertical at the point of attachment to trough 11. Flow control assembly 16c is attached by bracket 21c to flanges 17 and 18 at the top of sides 19 and 20 of trough 11, respectively. The upper part of suction pipe 10c is characterized by a central axis 34, and bracket 21c of flow control assembly 16c is offset from central axis 34. As used herein, the term "offset" is intended to refer to access to the suction pipe, from a position above the trough, with a cleaning rod, whereby the cleaning rod can be inserted at substantially the same angle as an imaginary axis extending outward from the center of the suction pipe. As also illustrated in FIG. 3, bracket 21 and the other components of flow control assembly 16 are offset from opening 23 and suction pipe 10c, such that the suction pipe can be rodded out with a straight rod. For example, a rigid rod can be inserted into the suction pipe a distance of 3 feet, a distance of 6 feet, or even through the entire length of the suction pipe, to dislodge a clog. In the case of a suction pipe that is curved or even sharply angled, the central axis is determined adjacent the point of attachment of the suction pipe to the trough.

Also within the scope of the invention is a configuration wherein a suction pipe attaches to the trough at an angle other than 90°. Referring to FIGS. 1 and 5, suction pipe 10d is characterized by central axis 35, which intersects trough 11 at an acute angle (shown as angle 9). For example, it some applications it may be more efficient to angle the outermost suction pipe (10d) outward, to sweep along the outer circumference of bottom 4 of tank 2, rather than to extend trough 11 to wall 3.

Thus, the flow rate of sludge drawn from the bottom of the clarifier tank to a trough that is partially submerged at the top of the tank can be readily controlled "on the fly", that is, without having to drain the sludge collection troughs to access the damper plate at the bottom of the trough. The flow rate can be individually controlled by a flow control assembly associated with each suction pipe, with the flow control assembly being affixed to the upper edges of the trough. The flow control assembly does not interfere with routine maintenance of the sludge collection system, because the flow control assembly is offset from the central axis defined by the pipe, thereby allowing clogs to be rodded out. In the embodiments illustrated herein, the flow control assembly can be adjusted and maintained from bridge 36.

There are, of course, many alternative embodiments and modifications, which are intended to be included within the scope of the following claims.

What I claim is:
1. A clarifier, comprising:
   (a) a tank for receiving a volume of liquid comprising suspended solids, whereby the volume defines a level of liquid within the tank, the tank having sides and a bottom;
   (b) a trough having a bottom, first and second sides extending upward from the bottom, and an opening through the bottom of the trough, wherein the trough is positioned horizontally in the clarifier tank, with the bottom of the trough below the level of liquid in the tank;
   (c) a suction pipe having an upper end connected to the opening in the bottom of the trough and extending downward from the trough and a lower end adjacent the bottom of the tank for receiving a sludge formed of the suspended solids in the liquid that have settled, the suction pipe is characterized by a central axis adjacent the opening in the trough; and
   (d) a flow control assembly to regulate the flow of sludge through the suction pipe and into the trough, comprising (i) a damper plate positioned over the opening in the bottom of the trough, wherein the damper plate is moveable relative to the bottom of the trough to restrict the flow of sludge; (ii) an arm having a lower end engaging the damper plate and an upper end extending upward from the bottom of the trough and above the level of liquid in the tank, whereby movement of the arm controls the position of the damper plate relative to the opening in the trough; (iii) a bracket attached to at least one side of the trough, whereby the bracket engages and supports the arm, the bracket further comprising a position indicator, which is visible from a position above the bracket and correlates the position of the arm and the position of the damper plate relative to the opening in the trough, and wherein the bracket is offset from the central axis of the suction pipe.

2. The clarifier of claim 1, wherein the first and second sides of the trough each have an upper edge that terminates in a flange and the bracket is attached to the flanges, spanning the trough.

3. The clarifier of claim 1, wherein the damper plate pivots in a horizontal plane to regulate the flow of sludge through the suction pipe, and the arm rotates to control the position of the damper plate.

4. The clarifier of claim 3, wherein the bracket position indicator comprises a calibrated section and the flow control assembly further comprises an index connected to the arm, whereby movement of the arm moves the index relative to the calibrated section of the bracket.

5. The clarifier of claim 1, wherein the arm controls the position of the damper plate by rotating, and the flow control assembly further comprises a lock plate connected perpendicularly to the control arm, the lock plate having an arcuate slot therein and a threaded fastener extending through the arcuate slot, whereby tightening the fastener secures the lock plate against the bracket, thereby locking the control arm in a desired orientation.

6. The clarifier of claim 5, wherein the fastener is a bolt having a threaded male end, which engages female threads provided in the bracket.

7. The clarifier of claim 5, wherein the bracket position indicator comprises a calibrated section and the lock plate comprises an index correlated to the calibrated section, whereby rotation of the arm moves the lock plate and the index relative to the calibrated section to show the position of the damper plate relative to the opening in the bottom of the trough.

8. The clarifier of claim 1, wherein the clarifier further comprises a receptacle centrally positioned in the tank, and the trough further comprises an open end in communication with the receptacle, whereby sludge collected in the trough flows into the receptacle.

9. The clarifier of claim 1, wherein from the bottom of the trough is provided with a total of from one to eight openings, and a total of from one to eight suction pipes are connected to the openings.

10. The clarifier of claim 1, wherein the tank is circular and the trough is supported by a central pier, and the trough revolves around the tank.

\* \* \* \* \*